UNITED STATES PATENT OFFICE.

JOHN T. DAVIS, OF SAN FRANCISCO, CALIFORNIA, ASSIGNOR OF ONE-HALF TO CHARLES W. KOHLSAAT, OF NEW YORK, N. Y.

ARTIFICIAL FUEL.

SPECIFICATION forming part of Letters Patent No. 595,673, dated December 14, 1897.

Application filed June 14, 1897. Serial No. 640,590. (No specimens.)

*To all whom it may concern:*

Be it known that I, JOHN T. DAVIS, a citizen of the United States, residing at San Francisco, in the county of San Francisco and State of California, have invented certain new and useful Improvements in Artificial Fuel; and I do hereby declare the following to be a full, clear, and exact description of the invention, such as will enable others skilled in the art to which it appertains to make and use the same.

This invention relates to artificial fuel.

The object is to produce an agglomerate fuel which will burn freely and be practically smokeless and in which falling apart or breaking up, either while burning, while being handled, or while being transported, will be obviated.

In carrying my invention into effect I employ, to each ton of coal-dust, culm, or coal-screenings, of slaked lime about eighty pounds, of gelatin, dissolved, what would be the equivalent of from six to ten pounds in a dry state, and of bichromate of potash about one pound dissolved in from one to three gallons of water, according to the amount of water the coal may hold due to exposure to the elements. In preparing these separate ingredients I first reduce stone-lime by sprinkling just enough of hot water over it to reduce it to a fine powder, and this is then sifted to free it from any lumps. I then dissolve in a separate vessel from six to ten pounds of gelatin, care being taken that its adhesive qualities be not destroyed by the employment of too much water. The bichromate of potash is placed in another vessel and dissolved with the necessary quantity of hot water, the proportion being about one pound of the bichromate of potash to from one to three gallons of water, the quantity of water being varied, as above stated, according to the moisture in the coal-dust, as the quantity and strength of the solution must correspond to the quantity of gelatin present in the ton of coal. The mixture is preferably to be pressed into form, as in molds.

The lime is to prevent the formation of clinker, as it will, as the fuel burns, combine with any silex or silicious matter present in the coal. Where the coal is free from clinker-forming impurities, the lime may be omitted.

The bichromate of potash and gelatin are to produce chromatized gelatin, presenting a binder insoluble in water and affording some oxygen to the coal in burning, causing free burning, without smoke, both from the fact of the supply of oxygen to the gelatin from the oxidizing agent and from the fact that a small percentage of the bichromate will be left as such.

Instead of bichromate of potash chrome-alum may be employed as an equivalent.

In making up the mixture the lime is first added to the coal-dust and after a thorough incorporation the gelatin solution is added, and, lastly, the bichromate solution, and if it is desired at once to bring about the chemical action between the gelatin and the bichromate the mixed mass should be brought to about 150° Fahrenheit, more or less; but if the mixture, as in briquets, is to be stored for a short time, or is to be transported some distance, the admixture may be performed while the mass is in a cold state, as the chemical change will take place between the gelatin and the bichromate in two or three days.

I have found that this mixture will answer for any kind of coal-dust, either anthracite, bituminous, or lignite, the bituminous and lignite series requiring an increased percentage of the chromatized gelatin to render it smokeless, as will be readily determined by experiment. The chromatized gelatin forms an admirable binder and one that is insoluble in water and will hold the particles of the coal tenaciously together under all conditions, either while being handled, while being transported, or while being burned.

Having thus described my invention, what I claim, and desire to secure by Letters Patent, is—

1. The process of making an agglomerate fuel, which consists in adding to finely-divided coal, a solution of gelatin, and, then, a solution of bichromate of potash, substantially as described.

2. The process of making an agglomerate fuel, which consists in adding to finely-divided coal, a solution of gelatin, then a solution of bichromate of potash, and then heating the mass to 150° Fahrenheit, more or less, substantially as described.

3. A composition of matter for artificial fuel, composed of finely-divided coal, a solution of gelatin, and a solution of bichromate of potash, in about the proportions specified, substantially as described.

4. A composition of matter for artificial fuel, consisting of the following ingredients, by weight: finely-divided coal about two thousand parts, slaked lime eighty parts, gelatin six to ten parts, bichromate of potash, one part, substantially as described.

In testimony whereof I affix signature in presence of two witnesses.

JOHN T. DAVIS.

Witnesses:
C. A. BLANCHARD,
CHARLES W. KOHLSAAT.